(12) United States Patent
Harmer (10) Patent No.: US 6,515,818 B1
(45) Date of Patent: Feb. 4, 2003

(54) TRACK FOLLOW AT QUARTER TRACK WITH NARROW HEADS USING NON-CONVENTIONAL ORDERING OF QUADRATURE FIELDS

(75) Inventor: Brent Jay Harmer, West Point, UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/265,934

(22) Filed: Mar. 11, 1999

(51) Int. Cl.$^7$ ............................................... G11B 5/596
(52) U.S. Cl. ................................. 360/77.08; 360/77.02
(58) Field of Search ........................... 360/77.02, 77.08, 360/78.04, 78.14, 77.07

(56) References Cited

U.S. PATENT DOCUMENTS

| | | | |
|---|---|---|---|
| 4,415,939 A | | 11/1983 | Ballard ........................ 360/75 |
| 4,536,809 A | * | 8/1985 | Sidman ..................... 360/77.04 |
| 5,450,249 A | * | 9/1995 | Nagaraj et al. ........ 360/77.02 X |
| 6,046,879 A | * | 4/2000 | Hampshire ............... 360/77.08 |
| 6,101,064 A | * | 8/2000 | Shepherd ................. 360/77.08 |
| 6,166,871 A | * | 12/2000 | Takaishi .................... 360/53 X |

* cited by examiner

*Primary Examiner*—Andrew L. Sniezek
(74) *Attorney, Agent, or Firm*—Woodcock Washburn LLP (57) ABSTRACT

A method and apparatus for performing track follow and seeking at quarter track positions that uses a non-conventional ordering of the servo fields at the quarter track positions, wherein C–A or D–B is used to track follow at –¼ track positions and A—D or B—C is used to track follow at +¼ track positions, for even and odd tracks, respectively. A position error signal is derived from relative amplitudes of the servo bursts and the read/write head is positioned over the quarter track position in accordance with the position error signal. The servo bursts are read in a time-displaced manner and the position error signal is determined from the relative amplitudes of the servo bursts. A servo controller is provided that includes a digital control/timing circuit that controls timing of events within the servo controller and generates an offset signal, a servo demodulator that receives a read back signal from the read/write head and determines a difference signal, a summing node that receives the difference signal and the offset signal, and a programmable gain stage that generates a position error signal based on an output of the summing node.

6 Claims, 7 Drawing Sheets

Prior Art

```
                                AAAAAA          CCCCCC
                                AAAAAA          CCCCCC
                                AAAAAA          CCCCCC
              +1/4 use  A-D _   AAAAAA_______________DDDDDD__
Even tracks:  center    A-B __  AAAAAA_______________DDDDDD___
              -1/4 use  D-B _________BBBBBB_______DDDDDD__
                                       BBBBBB       DDDDDD
              +1/4 use  B-C _________BBBBBB_CCCCCC______
Odd tracks:   center    B-A _________BBBBBB_CCCCCC__________
              -1/4 use  C-A _  AAAAAA______CCCCCC______
                                AAAAAA          CCCCCC
                                AAAAAA                  DDDDDD
                                AAAAAA                  DDDDDD
```

TRACK FOLLOW AT QUARTER TRACK WITH NARROW HEADS USING NON-CONVENTIONAL ORDERING OF QUADRATURE FIELDS

FIELD OF THE INVENTION

The present invention relates to a servo control method of a disk drive mechanism. More particularly, the present invention relates to a method of providing for track follow of a read/write head at a quarter track position and a method of quarter track seeking using the track follow technique.

BACKGROUND OF THE INVENTION

In a conventional disk drive system, the disk drive operates using two successive servo modes in accordance with the moving distance of a head. The first servo mode is concerned with a seek mode in which a head accesses tracks of a disk to search for and settle upon a desired target track. The second servo mode relates to a track following mode in which the head is accurately positioned on a data line of the target track for reading and writing data on the target position.

Figure 1A:
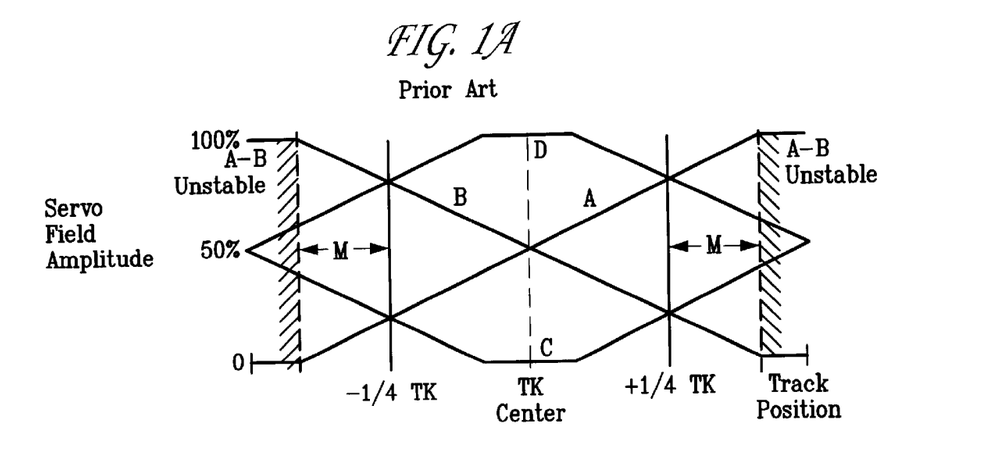
FIGS. 1A and 1B illustrate the relative amplitudes of the A, B, C and D servo fields as read from a magnetic recording disk with respect to track position in accordance with the prior art for wide (FIG. 1A—10 μm head) and narrow heads (FIG. 1B—7 μm head) on a 12 μm track and the effects of head width.
Figure 1B:
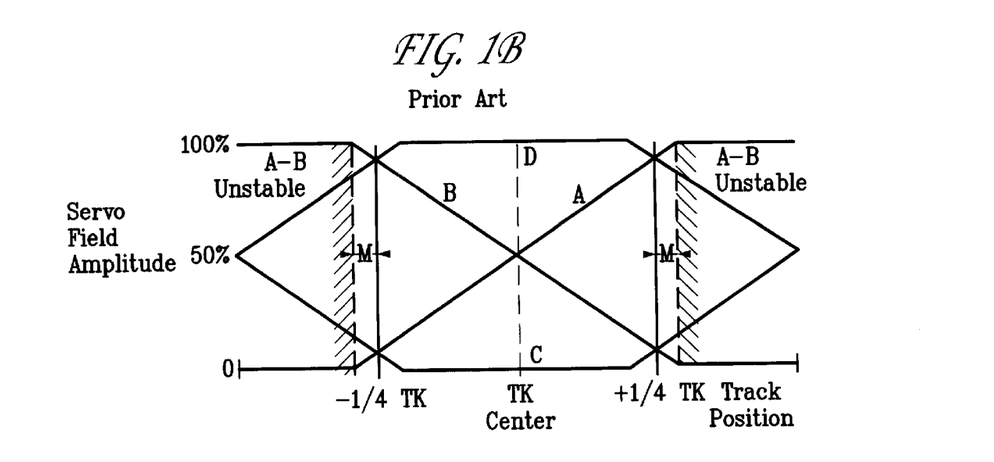

Conventional track follow methodology uses servo bursts that are typically designated as the "A", "B", "C" and "D" bursts. As shown in FIG. 1, the A, B, C and D bursts have varying amplitudes with respect to a track center line (TK center), such that when the head is positioned exactly over the center line of the target one of an odd or even track, approximately one-half of the amplitude of the A and B bursts will be read and when said head is positioned over the center line of the other of an odd or even track, approximately one-half of the amplitude of the C and D bursts will be read. As the head moves off the data line of the target track (ie, the center), the amplitude of one burst decreases while the amplitude of the other burst increases, depending on the direction of the misalignment. In this manner, a position error signal (PES) can be derived from the relative amplitudes of the A and B bursts, which are read in a timed displaced manner as the head passes over the bursts. Accordingly, if the head is properly centered with respect to the track, the difference of the A and B bursts (i.e., PES) equals zero.

Figure 2:
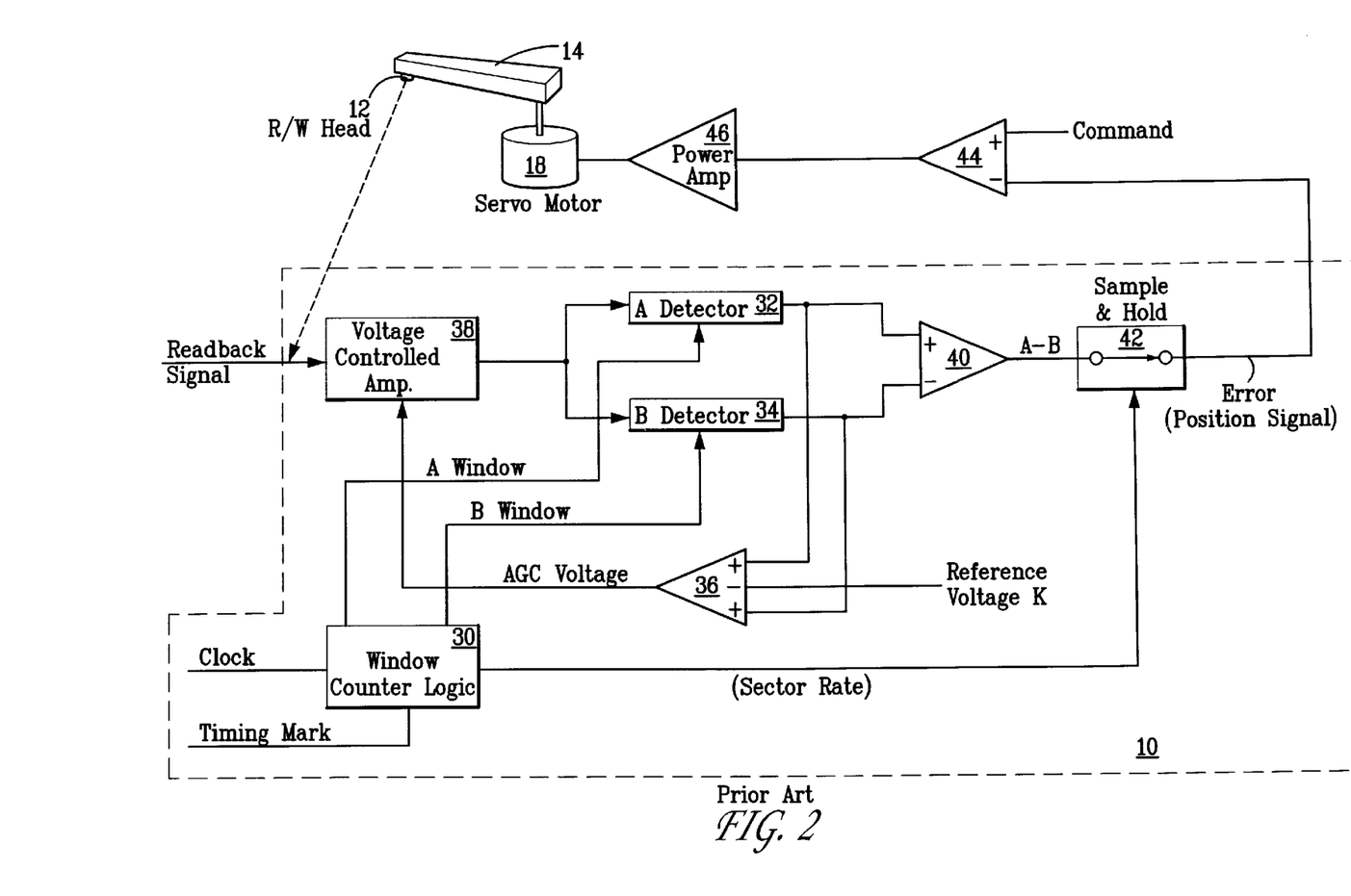
FIG. 2 is an overview of a disk drive using a prior art demodulation circuit for control of the positioning of a read/write head with respect to a magnetic recording disk.

An example of a conventional system within a disk drive to generate the PES is described in U.S. Pat. No. 4,415,939, entitled "Head Positioning Servo for Disk Drive", issued on Nov. 15, 1983, which is incorporated herein by reference in its entirety. This system is illustrated in FIG. 2, which shows a control circuit 10 for controlling the position of the read/write head 12 with respect to the disk track. Window counter logic 30 is provided, which sequentially enables A and B detectors 32 and 34, respectively, upon initialization by the supply of the timing mark to the window counter logic 30. This input, together with the read clock signal from the data channel, indicates at what times the A and B bursts are expected to be present. The outputs of the detectors 32 and 34 are summed in a summing node 36. This A+B signal is compared with a constant value K in an automatic gain control loop to control the amplification provided by a voltage controlled amp 38 which amplifies the read back signal supplied to the detectors 32 and 34. This maintains a constant value of A+B independent of head flying height variations and the like, and allows the amplitudes of the A and B bursts to be compared reliably to one another for position error determination. The difference of the outputs of the detectors 32 and 34 is determined in a differential amplifier 40, thus providing the A–B signal which is then stored in a sample and hold circuit 42. As noted above, when the head is following the center of the disk track, A–B is zero. Hence, the position error signal is zero. It is passed to a comparator and compensator 44, where it is compared with a command signal. If the command signal is also zero, the output of the comparator and compensator 44 to the power amplifier 46 is zero. The output of the power amplifier 46 is supplied to the servo motor 18, which moves the servo arm 14, which carries the read/write head 12, which in turn supplies new servo position information to the voltage-controlled amplifier 38.

By applying a non-zero DC level to the command input of FIG. 2, the servo system may locate the read/write head at a position offset from track center. With the proper DC level applied to the command input, the read/write head may be moved to the quarter track position. However, as the head width becomes much narrower than the track width, the usable offtrack range is reduced. Referring again to FIG. 1, when the heads are moved beyond the quarter track position, there is a point at which the A and B signals reach a maximum and/or minimum level and then do not change further as the heads are moved further offtrack. At this point, the servo system becomes unstable, since A–B is constant, regardless of changes in track position. The quarter track position margin "M" as indicated in FIG. 1, is herein defined as the additional position offset which may be applied beyond quarter track before the servo system becomes unstable. FIG. 1 illustrates that as the head width becomes narrower with respect to the track width, the position margin M is reduced. If the head width approaches ½ the track width, the position margin approaches zero and the system becomes unstable. Also note that as the head width changes, the slope of the A and B amplitudes versus track position also changes. The amplitude of PES (A–B) versus track position is dependent on the head width. Likewise, the amount of DC offset required at the command input of FIG. 2 to locate the heads at quarter track will vary depending on the head width. Thus, if a constant pre-programmed voltage is used to command the quarter track offset, drive to drive variations in head width will create a DC positioning error about the quarter track point for the read/write head.

In view of the above, it can be recognized that conventional servo systems have a number of drawbacks when performing track follow at the quarter track position. As such, a need exists for providing a disk drive that implements a technique of utilizing servo patters that overcomes the drawbacks of the prior art.

SUMMARY OF THE INVENTION

In accordance with an aspect of the invention, a method of performing track follow at quarter track positions is provided that comprises reading servo bursts designated as A, B, C and D servo bursts located on the disk; deriving a position error signal from relative amplitudes of the servo bursts; and positioning the read/write head over the quarter track position in accordance with the position error signal. The method may include reading the servo bursts in a time-displaced manner, and the position error signal may be determined from the relative amplitudes of the servo bursts. The position error signal may be based on one of C–A and D–B when track following at −¼ track positions and one of A–D and B–C when track following at +¼ track positions In accordance with another aspect of the invention, there is provided a servo controller for controlling a position of a read/write head with respect to a track on a disk within a disk drive wherein the disk preferably includes servo bursts being designated as A, B, C and D servo bursts having varying amplitudes with respect to a center line of the track. The servo controller may comprise a digital control/timing circuit that controls timing of events within the servo controller and generates an offset signal; a servo demodulator that receives a read back signal from the read/write head and determines a difference signal; a summing node that receives the difference signal and the offset signal; and a programmable gain stage that generates a position error signal based on an output of the summing node.

According to a feature of the invention, the servo demodulator may receive the read back signal and, in accordance with a track position, demodulate selected servo bursts to determine a difference signal. The difference signal for even tracks may be determined as C–A for –¼ track positions and A–D for +¼ track positions, and the difference signal for odd tracks may be determined as D–B for –¼ track positions and B–C for +¼ track positions. In addition, the offset signal is preferably ramped up and down during quarter track seek operations to minimize fluctuations of the position error signal. The programmable gain stage preferably maintains a constant loop gain for differing servo field difference signals.

According to yet another aspect of the invention, there is provided a method of performing quarter track seek operations in a disk drive having a servo control unit for controlling a position of a read/write head with respect to a track. The disk includes servo bursts having varying amplitudes with respect to a center line of the track, and the servo bursts are preferably designated as A, B, C and D servo bursts. The servo control unit may include a control/timing circuit that generates an offset signal, a demodulator that receives a read back signal from the read/write head and determines a difference signal, a summing node that receives the difference signal and the offset signal, a programmable gain stage that generates a position error signal based on an output of the summing node. The method of performing quarter track seek operations preferably comprises adjusting the offset signal a first amount; switching the difference signal from A–B to alternate servo fields; changing the loop gain; adjusting the offset signal a second amount; and allowing the read/write head to settle.

According to a feature of the invention, the step of adjusting the offset signal a first and second amount may comprise raising or lowering the offset signal 12.5%. Additionally, the step of switching the difference signal from A–B to the alternate servo fields preferably occurs at approximately ⅛ of a track offset. Preferably, the alternate servo fields comprise one of A–D, D–B, C–A and B–C.

The foregoing and other aspects of the present invention will become apparent from the following detailed description of the invention when considered in conjunction with the accompanying drawings.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF THE INVENTION

Figure 3A:
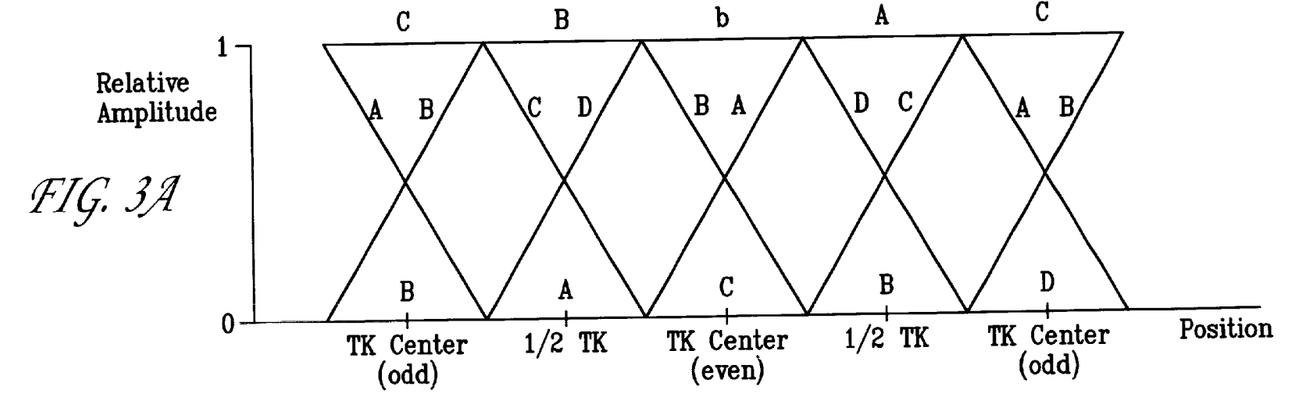
FIG. 3 illustrates the relative amplitudes of the A, B, C and D servo fields with respect to track position over several tracks for a head width of ½ the track width, as well as the various difference signals which result from pairing up conventional and non-conventional sets of servo fields.
Figure 3B:
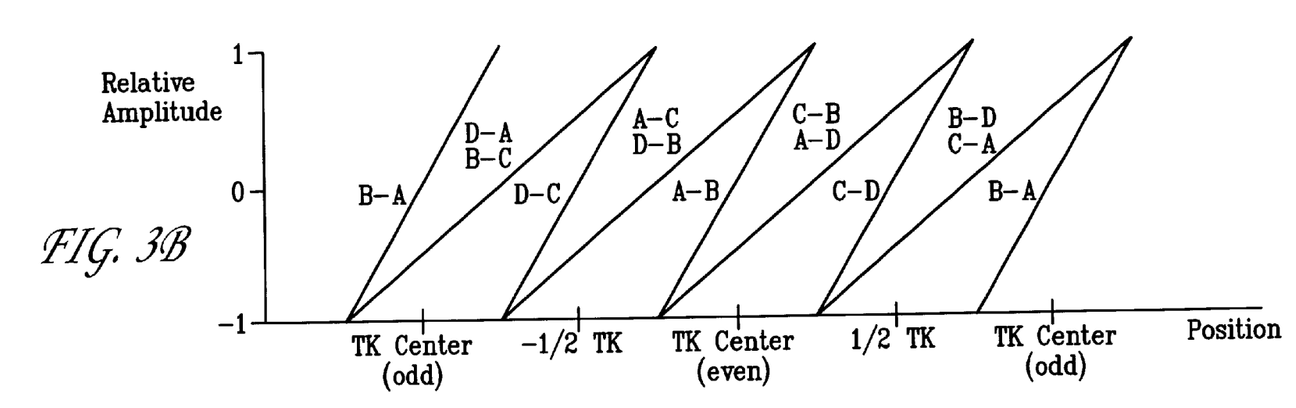
Figure 4:
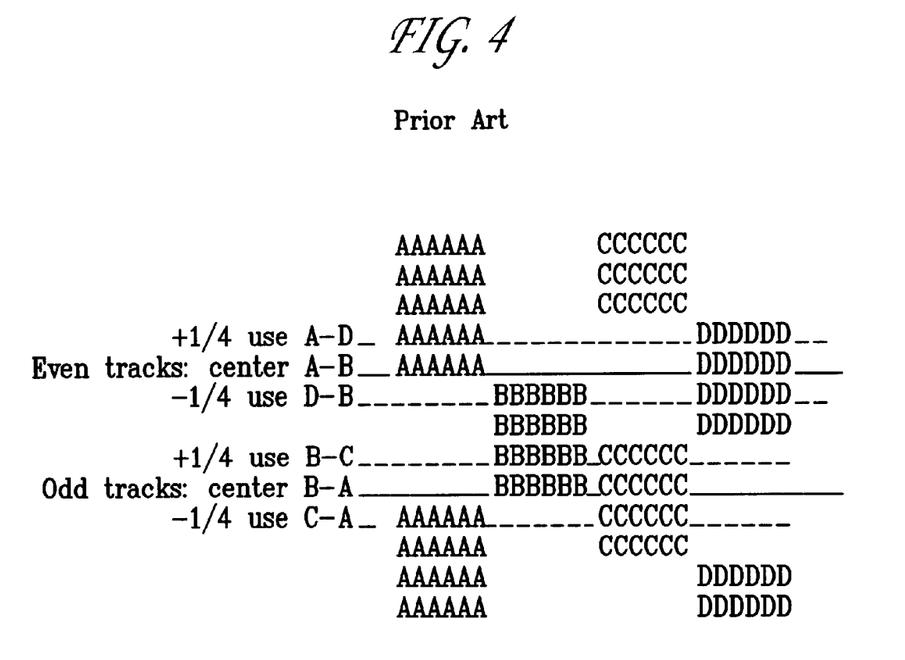
FIG. 4 illustrates the physical layout of the servo fields on the disk and the preferred servo field pairs to use for track follow at various track center and quarter track locations.

The present invention overcomes the deficiencies of the prior art by implementing an improved track follow methodology at the quarter track positions. The present invention proposes using a non-conventional ordering of the servo fields at the quarter track positions, wherein C–A or D–B is used to track follow at +¼ track positions and A–D or B–C is used to track follow at +¼ track positions, for even and odd tracks, respectively, as illustrated in FIGS. 3 and 4. The proposed servo pattern to be written on the disk is the conventional quadrature ABCD pattern as indicated in FIG. 4. However, the manner in which the servo patterns are paired and subtracted from one another to generate the position error signal is non-conventional.

FIG. 3 contains graphs of the relative amplitudes of the servo patterns versus track position and the relative amplitude of the difference of servo fields versus track position. FIGS. 3 and 4 illustrate the conventional ordering of servo fields for track center locations and the non-conventional ordering of servo fields for quarter track locations. At each quarter track point there are two pattern pairs to choose from: one in which both fields are low amplitude and another in which both fields are near full amplitude. The servo patterns used for track following are selected by the digital control circuit 54 shown in FIG. 5. A difference of the selected servo fields (e.g., A–B) is used in determining PES that, in turn, is input to the servo motors to position the read/write head 12 over a particular track location.

The technique of the present invention offers several advantages over conventional systems, such as an ability to track follow when the read/write head is centered on quarter track without the necessity of applying a DC offset to the position error signal (PES). The quarter track position is accurate independent of head width. Further, the present invention provides for a usable track follow range of +/−½ track centered about the ¼ track point instead of +−¼ tracks referenced to track center (FIG. 3). Such an increased range provides for greater positional margin (M) to compensate for position errors while track following at quarter track. The present invention is particularly useful in high capacity removable disk drives, such as the 250 MB Iomega ZIP drive manufactured by Iomega Corp., Roy, Utah. The 250 MB Iomega Zip drive is manufactured to read and write to disks having either 100 MB or 250 MB capacities, because it is highly desirable for the 250 MB Iomega Zip drive to be backwardly compatible to read and write the older 100 MB disks. One of the factors enabling the increase in capacity from 100 MB to 250 MB media is the increase in track density from 2118 TPI (tracks per inch) to 3315 TPI. Accordingly, for the 250 MB Iomega Zip drive to read and write to the 250 MB media, the read/write head must be narrower than that used in the older 100 MB Iomega Zip drive.

Because of the relatively narrow 250 MB Iomega Zip drive read/write heads (6.4 $\mu$m +−0.4 $\mu$m) and the wider track width of the 100 MB disk (12 elm), the 250 MB Iomega Zip drive read/write head cannot erase and write to the 100 MB disk in a single pass over a destination track. For the 250 MB Iomega Zip drive to write to 100 MB media, a three pass write operation is performed. In the three pass write operation, the read/write head is moved to +¼ track and performs an erase on the track. Then the read/write head is moved to −¼ track and performs an erase on the track. Finally, the read/write head is moved to the center of the track and the data is written. In performing the two erase passes, the 250 MB Iomega Zip drive requires the ability to accurately track follow at the quarter track position. The present invention provides a solution to implement this requirement of the 250 MB Iomega Zip drive.

Figure 5:
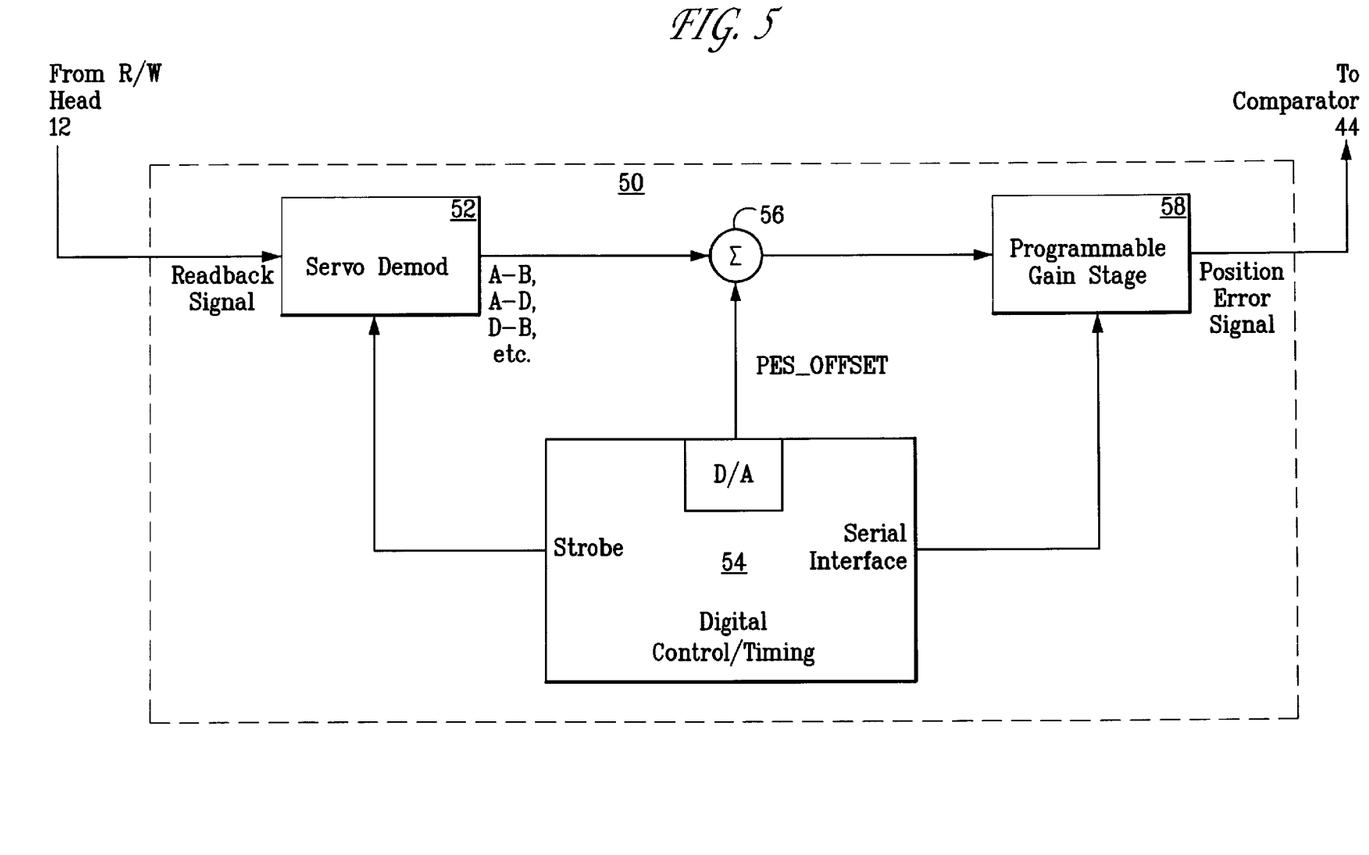
FIG. 5 is a block diagram of a servo controller circuit in accordance with the present invention.

FIG. 5 is a block diagram that illustrates an exemplary hardware implementation of the servo controller 50 of the present invention, which is utilized in the 250 MB Iomega Zip drive. The servo controller 50 maybe substituted for the controller 10 of the prior art shown in FIG. 2. The servo digital control/timing 54 may be implemented in suitable firmware running in a custom ASIC. The servo demodulator may be implemented within the read channel IC. The programmable gain stage may be implemented within a custom servo spindle/actuator control IC. As illustrated, a servo demodulator 52 receives the read back signal from the read/write head 12 and, in accordance with the track position, demodulates selected servo signals to determine a difference signal (e.g., A−B, A−D, D−B, etc). The selection of servo fields to determine the difference signal has been described above. The difference signal provides one of two signals to a summing node 56. A digital control circuit 54 is provided to ensure the proper timing of events within the servo controller 50. For example, the digital control circuit 54 determines which difference signal is applied to the summing node 56 and also outputs an offset value (PES_OFFSET) as a second input to the summing node 56. As will be discussed below, the PES_OFFSET signal is ramped up and down during quarter track seek operations to minimize fluctuations of the PES signal. The output of the summing node 56 is applied to a programmable gain stage 58, which generates the position error signal (PES). The programmable gain stage 58 maintains a constant loop gain for differing servo field difference signals. This is described in greater detail below. The PES signal is used to control the position of the read/write heads 12. Thus, as noted above, the present invention provides for a novel apparatus and method for performing track follow at quarter track positions by using a non-conventional ordering of the servo fields.

Figure 6:
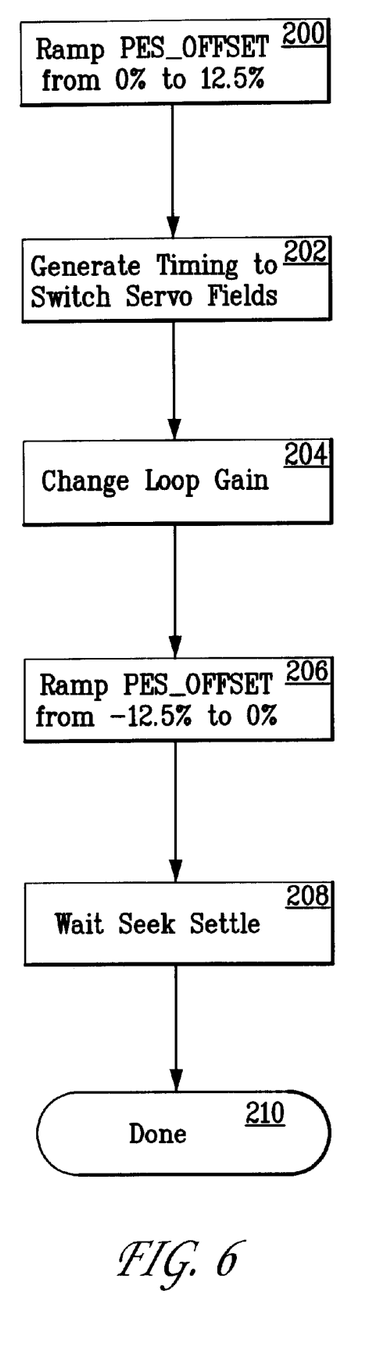
FIG. 6 is a flow chart illustrating the processes performed in seeking from track center to a quarter track position.
Figure 9:
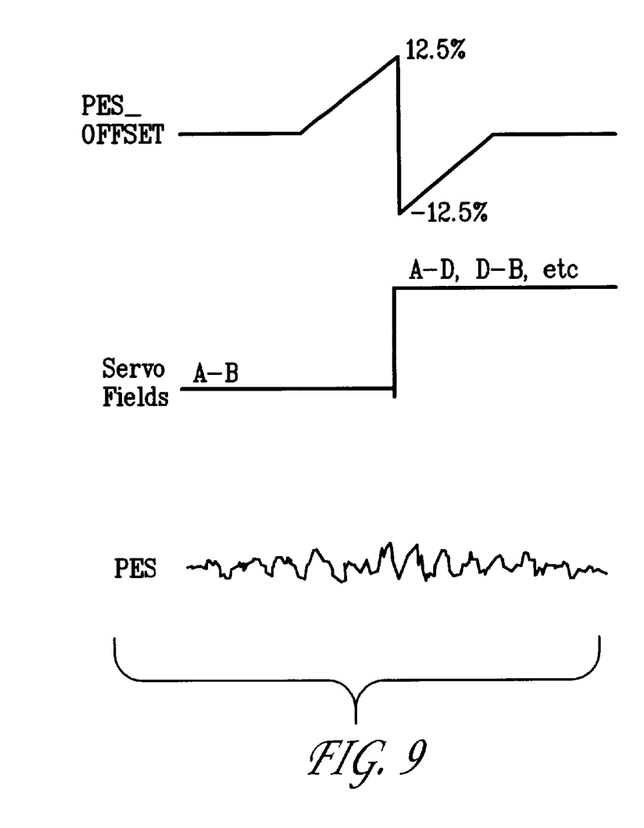
FIG. 9 illustrates the effect of switching servo fields on the position error signal in accordance with the present invention.

The present invention also provides for a technique for performing quarter track seek operations using the non-conventional ordering of the servo fields. Referring now to FIG. 6, there is illustrated the process by which the head is moved from the center to the quarter track position. FIG. 9 illustrates a timing diagram of the processes described in FIG. 6. Initially, PES_OFFSET is ramped from 0% to 12.5% of track (Step 200). Quarter track seeks are implemented by using the PES_OFFSET (as implemented by the digital control circuit 54) to provide a ramped position trajectory to the quarter track location. At approximately ⅛ track offset, the servo fields are switched from A−B to the alternate fields (e.g., A−D or D−B) listed above (Step 202). The digital control circuit 54 generates the STROBE signal to the servo demodulator, where it defines which servo fields that are to be differenced and summed with PES_OFFSET as indicated in FIG. 5.

Next, the loop gain is changed (Step 204). When the servo fields are changed from e.g., A−B to A−D, the servo loop gain defined by the demodulator 52 becomes approximately one-half of the prior servo loop gain. This is evidenced in FIG. 3, which illustrates that the slopes of the non-conventional pattern difference amplitudes are ½ that of the conventional pattern difference amplitudes versus track position. Therefore, the programmable gain must be increased in order to maintain the new overall loop gain at its prior loop gain. The PES_OFFSET switches polarity at this point to −12.5%, since the position reference is now the quarter track point and not track center. PES_OFFSET is then ramped from −12.5% to 0% (Step 206) and the system waits for the head to settle (Step 208). The process is then complete (Step 210).

Figure 7:
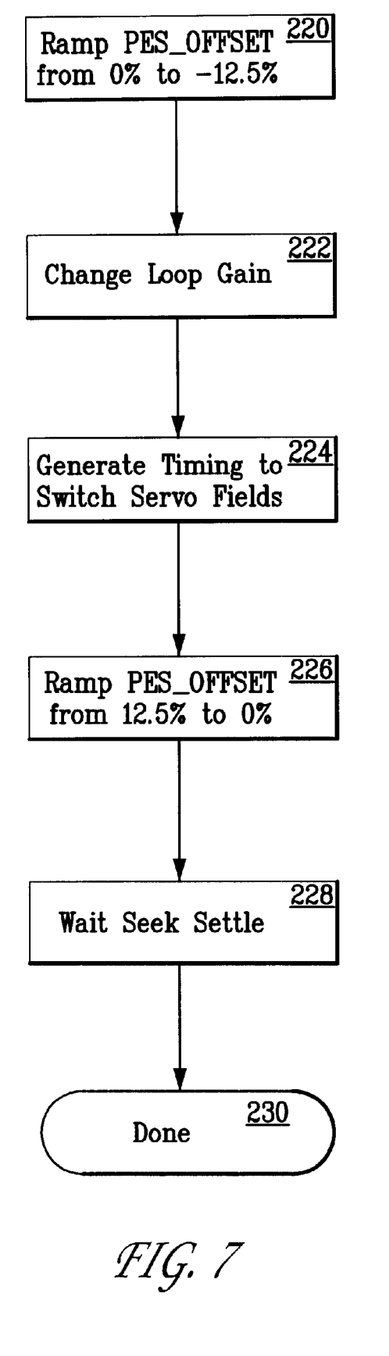
FIG. 7 is a flow chart illustrating the processes performed in seeking from a quarter track position to center track.

Referring to FIG. 7, there is illustrated the process by which the head is moved from the quarter track position to the center position. As the steps in FIG. 7 are performed in similar fashion to those of FIG. 6, the detailed description of the steps of FIG. 7 will not be repeated herein again. In accordance with the techniques of FIGS. 6 and 7, the present invention provides for a quarter track seek operation which is very reliable and which generates very little PES error.

Figure 8:
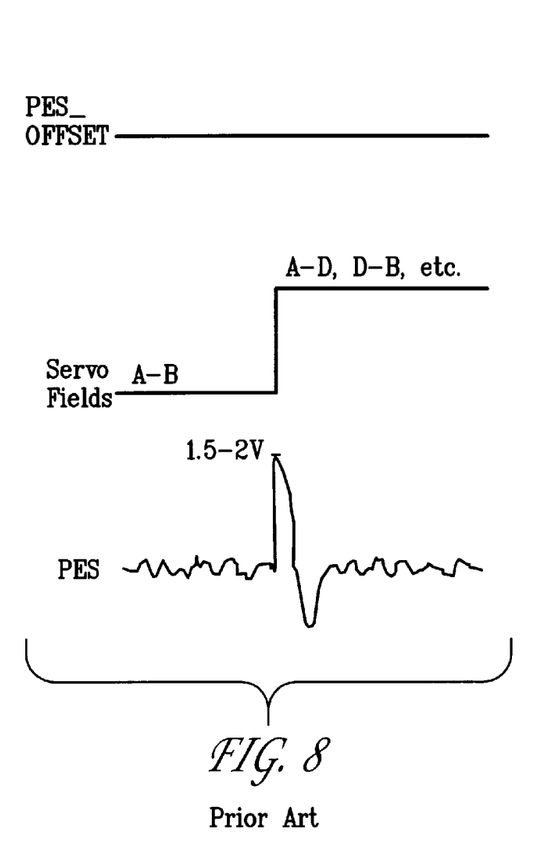
FIG. 8 illustrates the effect of switching servo fields on the position error signal in accordance with prior art.

Referring now to FIGS. 8 and 9, there are timing diagrams illustrating a comparison of the prior art method of switching servo fields (FIG. 8), with that of the present invention (FIG. 9) as implemented by the controller 50 of FIG. 3. With the prior art method of seeking to quarter track, the servo field pattern is switched (e.g., A−B to A−D) with no PES_OFFSET applied and immediately a ¼ track error appears on PES, which then settles to zero as the servo system responds. The primary problem with this implementation is that the initial PES disturbance encountered after switching the servo fields may be large enough to saturate analog circuitry and thereby extend the required settle time. The resulting seek may be unreliable. In the present invention, since the heads are ramped to the ⅛ track point prior to switching the servo fields, the PES signal does not spike when the servo fields are switched. Thus, the present invention reduces the instance of errors during the seek due to PES fluctuation.

It is noted that the foregoing examples have been provided merely for the purpose of explanation and are in no way to be construed as limiting the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. In a disk drive having a servo control unit for controlling a position of a read/write head with respect to odd and even tracks written to a disk with servo bursts designated as A, B, C, and D in a quadrature A B C D pattern, such that when said head is positioned over the half-track of one of said odd and even tracks, approximately one-half of the amplitude of the A and B bursts will be read and when said head is positioned over the half-track of the other of said odd or even tracks, approximately one-half of the amplitude of the C and D bursts will be read, a method of performing track follow at quarter track positions, comprising:

reading, with said read/write head, said servo bursts located on said disk;

deriving a position error signal from amplitudes of said servo bursts;

positioning said read/write head over said quarter track position in accordance with said position error signal;

and wherein said step of deriving a position error signal from amplitudes of said servo bursts comprises:

determining one of C−A and D−B when track following at −¼ track positions; and determining one of A−D and B−C when track following at +¼ track positions.

2. The method as recited in claim 1, wherein C−A is determined when track following at ¼ track positions and A−D is determined when track following at +¼track positions for even tracks.

3. The method as recited in claim 1, wherein D−B is determined when track following at ¼ track positions and B−C is determined when track following at +¼track positions for odd tracks.

4. A servo controller for controlling a position of a read/write head with respect to a track written to a disk within a disk drive, said disk including servo bursts having varying amplitudes in a quadrature A, B, C, D, pattern, such that when said head is positioned over the half-track of one of said odd and even tracks, approximately one-half of the amplitude of the A and B bursts will be read and when said head is positioned over the half-track of the other of said odd or even tracks, approximately one-half of the amplitude of the C and D bursts will be read, said servo controller comprising:

a digital control/timing circuit that controls said servo controller and generates an offset signal;

a servo demodulator that receives a read back signal from said read/write head and determines a difference signal, said servo demodulator receiving said read back signal and, in accordance with a track position, demodulating selected servo bursts to deter a difference signal, said difference signal for even tracks comprising C−A for −¼ track positions and A−D for +¼ track positions, and said difference signal for odd tracks comprising D−B for −¼ track positions and B−C for +¼ track positions;

a summing node that receives said difference signal and said offset signal;

a programmable gain stage that generates a position error signal based on an output of said summing node.

5. The servo controller as recited in claim 4, wherein said offset signal is ramped during quarter track seek operations to minimize fluctuations of said position error signal.

6. The servo controller as recited in claim 4, wherein said programmable gain stage maintains a constant loop gain for differing servo signals.

* * * * *

UNITED STATES PATENT AND TRADEMARK OFFICE
CERTIFICATE OF CORRECTION

PATENT NO.   : 6,515,818 B1
DATED        : February 4, 2003
INVENTOR(S)  : Brent J. Harmer It is certified that error appears in the above-identified patent and that said Letters Patent is hereby corrected as shown below:

Column 5,
Line 17, "(6.4$\mu$m + -0.4$\mu$m)" should be -- (6.4$\mu$m +/- 0.4 $\mu$m) --
Line 18, "(12 elm)" should be -- (12$\mu$m) --.

Column 8,
Line 34, after "servo" insert -- field difference --

Signed and Sealed this

Twenty-third Day of December, 2003

JAMES E. ROGAN
*Director of the United States Patent and Trademark Office*